US005881460A

United States Patent [19]

Nowell, III et al.

[11] Patent Number: 5,881,460

[45] Date of Patent: Mar. 16, 1999

[54] METHOD FOR FASTENING CONCRETE REINFORCEMENT STEEL USING DEFORMABLE METAL FASTENER CLIPS

[76] Inventors: Stephen C. Nowell, III, 3621 Manatee Ave. W, Bradenton, Fla. 34205; A. Carter Nowell, 2400 Clarendon Blvd., #915, Arlington, Va. 22201

[21] Appl. No.: 926,917

[22] Filed: Sep. 10, 1997

[51] Int. Cl.[6] .......... B23P 19/04

[52] U.S. Cl. .......... 29/897.34; 29/460; 29/513; 29/525.05

[58] Field of Search .......... 29/897.34, 460, 29/513, 525.05, 816, 243.56; 72/409.02, 409.03, 453.16; 52/685, 686, 688, 665, 719

[56] References Cited

U.S. PATENT DOCUMENTS

| | | | |
|---|---|---|---|
| 1,047,655 | 12/1912 | Koerner . | |
| 2,816,288 | 12/1957 | Heilman et al. | 72/453.16 |
| 2,969,545 | 1/1961 | Allen | 29/243.56 |
| 3,017,905 | 1/1962 | Klein | 72/453.16 |
| 3,044,217 | 7/1962 | Berry . | |
| 3,200,488 | 8/1965 | Johansson | 29/897.34 |
| 3,252,263 | 5/1966 | Korf . | |
| 3,300,930 | 1/1967 | Weise . | |
| 3,331,179 | 7/1967 | Ernst et al. . | |
| 3,537,293 | 11/1970 | Gerlach | 72/453.16 |
| 3,628,230 | 12/1971 | Grise . | |
| 3,810,495 | 5/1974 | Pack | 29/243.56 |
| 4,096,680 | 6/1978 | Ritter et al. | 52/665 |
| 4,110,951 | 9/1978 | Padrum . | |
| 4,158,082 | 6/1979 | Belousofsky | 264/DIG. 57 |
| 4,190,999 | 3/1980 | Hampton . | |
| 4,610,122 | 9/1986 | De Clercq . | |
| 4,890,474 | 1/1990 | Agostini et al. | 29/243.56 |
| 4,993,135 | 2/1991 | Seeley et al. | 29/243.56 |
| 5,020,355 | 6/1991 | Payne et al. | 29/243.56 |
| 5,035,040 | 7/1991 | Kerrigan et al. . | |
| 5,123,273 | 6/1992 | Kawabata . | |
| 5,371,991 | 12/1994 | Bechtel et al. . | |
| 5,392,580 | 2/1995 | Baumann . | |
| 5,483,815 | 1/1996 | West . | |

*Primary Examiner*—David P. Bryant
*Attorney, Agent, or Firm*—Jeffrey L. Thompson; Thompson & Thompson, P.A.

[57] ABSTRACT

An apparatus and method for fastening concrete reinforcement steel members together using deformable metal fastener clips. The concrete reinforcement steel members are used to strengthen concrete structures in a known manner and can be in the form of wire mesh sheets or rebar positioned in a grid pattern. The deformable metal fastener clips are generally U-shaped members that are open on one side before being deformed so that the fastening clips can be easily placed over two or more adjacent reinforcement steel members. The metal fastener clips are deformed around the reinforcement steel members to close the open side of the metal fastener clips, thereby securing the reinforcement steel members together in a desired formation. The free ends of each fastener clip preferably overlap each other after the fastener clips are closed around the reinforcement steel members. The reinforcement steel members can be secured together within a concrete form, or they can be secured together offsite and placed in a concrete form before filling the form with concrete. The deformable fastener clips can be used to efficiently secure reinforcement steel members together during concrete construction with a simple squeeze of the fastener clips around the reinforcement steel members. The steel members can thus be secured together in substantially less time than other conventional methods, and with substantially less cost in both materials and labor.

8 Claims, 2 Drawing Sheets

METHOD FOR FASTENING CONCRETE REINFORCEMENT STEEL USING DEFORMABLE METAL FASTENER CLIPS

BACKGROUND OF THE INVENTION

1. Field of the Invention

The present invention relates generally to fastener devices and concrete construction and, in particular, to a method and apparatus for fastening concrete reinforcement steel members together during concrete construction.

2. Description of the Related Art

Deformable metal fasteners called "hog rings" were originally developed in the 18th century to prevent hogs from rooting under fences that confined them. The hog ring device was inserted in a hog's nose and would cause discomfort and irritation if the animal tried to use its snout to dig. The hog ring was later used in a similar fashion on other livestock and also to connect wire fencing in agricultural applications.

In the early 1930's, automobile manufacturers began using hog rings to secure springs and wire in automotive seating. Today, hog rings are still widely used in the automotive industry for this purpose. Hog rings are also employed in the production of low cost upholstered furniture to attach upholstery material to a wire or rod support. Hog rings are similarly used as a fastening device in the bedding industry and in a variety of other industries.

A conventional hog ring fastener consists of a 15-gage wire having a length less than two inches, which is formed into a curved, C-shape with pointed, converging legs. The fastener is deformed when applied by a tool to close and cross the legs and form a loop around a work piece. Known hog ring fasteners are often assembled in strips or sticks and are dispensed in a tool one at a time from a magazine. Conventional C-shaped hog ring fasteners are disclosed, for example, in U.S. Pat. Nos. 5,123,273 and 5,483,815.

Hog ring fasteners are generally designed with a structure or shape that prevents the opposed legs of the fastener from abutting and interfering with one another as the fastener is formed into a loop or ring. Such interference is undesirable because it can prevent the desired forming of the fastener into a loop and can cause jamming or wear and damage to a fastener application tool. The most common way to prevent interference between the legs of a hog ring is to provide the opposed legs with points that are offset or oppositely beveled, as shown, for example, in U.S. Pat. No. 3,628,230. Another known way to prevent interference between the legs of a hog ring is to provide an offset in the legs of the hog ring, as shown, for example, in U.S. Pat. No. 5,035,040.

Precast concrete, such as pipe, drainage structures, and building components (e.g., lintels, wall, floor, and roof panels) are normally reinforced with a latticework of rebar or wire mesh steel in single or multiple layers to enhance the strength of the concrete. The same is true of prestressed concrete, such as building components, bridge beams, and so forth. This is also the method used to reinforce virtually all cast-in-place concrete. For example, concrete highways are typically reinforced with a double mat of No. 5 rebar on six inch centers. When the concrete is being formed using reinforcement steel rebar or wire mesh, the rebar or wire mesh is typically laid out in a grid-like pattern or framework in a concrete form and secured together loosely using wire ties. The reinforcement steel is thus held in place temporarily by the wire ties while concrete is being poured around it. After the concrete sets, the reinforcement steel members are then permanently positioned within the concrete.

Most reinforcement steel members used in commercial concrete construction have been tied together in the same way for many years. The wire ties used to tie the reinforcement steel members together typically comprise very light gage, mild steel wire supplied on a belt-mounted reel. The wire is pulled from the belt-mounted reel, wrapped around the reinforcement steel members, pulled taut with side cutters or pliers, twisted, and cut. This conventional process of tying together reinforcement steel members is very labor intensive and, therefore, adds considerable labor costs to concrete construction jobs.

For example, reinforcement steel can be tied at concrete construction sites by skilled laborers at a rate of approximately 10 seconds per tie and a cost of $18 to $20 per hour using a reel of wire and pliers. Reinforcement steel can also be tied by semi-skilled laborers at a rate of approximately 25 seconds per tie and a cost of $6 to $8 per hour using a conventional loop or swivel process. The net cost of these two processes works out to be about the same.

Manufactured loop ties and hand swivels have also been used to secure reinforcement steel members together during concrete construction. For example, U.S. Pat. No. 3,331,179 discloses a grid of reinforcement steel members secured together, in part, using manufactured spacer rings at the intersection points of the reinforcement steel rods. The manufactured spacer rings are formed with a split 7 (FIG. 3) for spreading the ring to mount the ring over the reinforcement steel rods. After the spread ring is mounted over the reinforcement steel rods, release of the spread ring results in reclosing of the ring upon the rods by virtue of the elasticity of the material.

Such manufactured spacer rings are expensive to make because they require a relatively large amount of spring steel material for each ring to perform the intended function of spacing the grid away from the bottom surface of the concrete form, and also to provide the elasticity to reclose the ring upon the rods after the ring is spread to mount the ring over the rods. Moreover, such manufactured spacer rings are inefficient to use because they require a rather difficult and tedious process of spreading the rings during installation.

Hog rings and similar fasteners have not been previously used in the construction industry to secure reinforcement steel, such as rebar and welded heavy gage wire mesh, during concrete construction.

SUMMARY OF THE INVENTION

It is an object of the present invention to provide a method and apparatus for fastening concrete reinforcement steel during concrete construction that solves the problems associated with the conventional fastening methods described above.

More specifically, it is an object of the present invention to provide a method and apparatus for fastening concrete reinforcement steel during concrete construction that is inexpensive and easy to use, and that substantially reduces the amount of time required to securely fasten reinforcement steel for concrete structures.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

The present invention provides an apparatus and method for fastening concrete reinforcement steel members together using deformable metal fastener clips. The concrete reinforcement steel members which are fastened together by the present invention are used to strengthen concrete structures in a known manner and can be in the form of wire mesh sheets or rebar positioned in a grid pattern. The deformable metal fastener clips are generally U-shaped members that are open on one side before being deformed so that the fastening clips can be easily placed over two or more adjacent reinforcement steel members. The metal fastener clips are deformed around the reinforcement steel members to close the open side of the metal fastener clips, thereby securing the reinforcement steel members together in a desired formation. The free ends of each fastener clip preferably overlap each other after the fastener clips are closed around the reinforcement steel members. The reinforcement steel members can be secured together within a concrete form, or they can be secured together offsite and placed in a concrete form before filling the form with concrete. The deformable fastener clips can be used to efficiently secure reinforcement steel members together during concrete construction with a simple squeeze of the fastener clips around the reinforcement steel members. The steel members can thus be secured together in substantially less time than other conventional methods, and with substantially less cost in both materials and labor.

In accordance with the present invention, in order to solve the problems described above, a method for fastening concrete reinforcement steel is provided comprising the steps of providing a generally U-shaped, deformable fastening clip having an open side for receiving reinforcement steel members, positioning at least two reinforcement steel members adjacent to each other, placing the deformable fastening clip over the reinforcement steel members, and deforming the fastening clip to close the open side about the reinforcement steel members to thereby secure the reinforcement steel members together.

The method also preferably comprises the steps of deforming the fastening clip until the ends of the fastening clip overlap each other to ensure that the reinforcement steel members are held securely. After the reinforcement steel members are secured together by the fastening clips, concrete is then formed around the reinforcement steel members and the fastening clips, thereby permanently fixing the position of the reinforcement steel members.

The deformable fastening clip according to one embodiment is formed with at least one leg bent away from a plane containing the body portion of the deformable fastening clip to prevent the ends of the fastening clip from abutting and interfering with each other when the fastening clip is deformed over the reinforcement steel members. The deformable fastening clip according to another embodiment is entirely flat and is deformed by an applicator having offset jaws to prevent the legs of the fastening clip from abutting and interfering with each other as the fastening clip is closed over the reinforcement steel members.

The deformable fastening clip is preferably made from 12 to 14 gage steel having a length greater than approximately four inches.

According to another aspect of the present invention, the objects and advantages of the invention are achieved by an apparatus for reinforcing concrete structures, comprising a plurality of reinforcement steel members, and a plurality of generally U-shaped, deformable fastening clips which are each closed about two or more adjacent reinforcement steel members, the reinforcement steel members being secured together in a grid pattern by the deformable fastening clips.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

A deformable fastening clip 10 according to a first embodiment of the present invention will now be explained with reference to FIGS. 1(*a*) to 1(*c*) of the accompanying drawings.

Figure 1A:
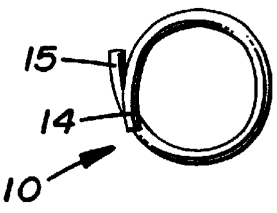
FIGS. 1(*a*) to 1(*c*) illustrate a deformable fastening clip according to a first embodiment of the present invention, wherein FIG. 1(*a*) is a side view of the fastening clip in a closed position, FIG. 1(*b*) is an end view of the fastening clip in an open position, and FIG. 1(*c*) is a side view of the fastening clip in an open position.
Figure 1B:
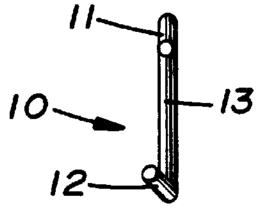
Figure 1C:
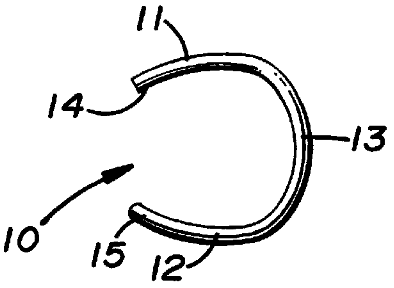

As shown in FIGS. 1(*b*) and 1(*c*), a deformable fastening clip 10 according to the present invention is formed in a generally U-shape with an open side before it is deformed around the reinforcement steel members. The fastening clip 10 has first and second legs 11, 12 and a body portion 13 connecting the first and second legs 11, 12. The first and second legs 11, 12 are curved slightly along their length to facilitate closing the fastening clip 10 over the reinforcement steel members. As shown in FIG. 1(*b*), one of the legs 12 of the fastening clip 10 is bent away from a plane containing the other leg 11 so as to prevent the legs 11, 12 from abutting and interfering with each other when the fastening clip 10 is deformed into a closed position (FIG. 1(*a*)) over a pair of adjacent reinforcement steel members. In its deformed or closed position, as shown in FIG. 1(*a*), the fastening clip 10 has its ends 14, 15 overlapped to better secure the fastening clip 10 around the reinforcement steel members.

The shape of the deformable fastening clip 10 shown in FIGS. 1(*b*) and 1(*c*) is similar to the shape of a conventional hog ring. However, the deformable fastening clip 10 is constructed of a heavier gage steel wire and a longer length than conventional hog rings so as to be suitable for securing together concrete reinforcement steel members, such as rebar and heavy gage wire mesh. In a preferred embodiment, the fastening clip 10 is constructed of 12 to 14 gage steel wire having a length of approximately 4 to 6 inches. In some applications, such as when extra large steel rebar is used in a concrete construction project, an even heavier gage steel wire or longer length can be used for the fastening clip 10.

Figure 2A:
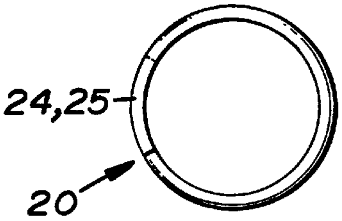
FIGS. 2(*a*) to 2(*c*) illustrate a deformable fastening clip according to a second embodiment of the present invention, wherein FIG. 2(*a*) is a side view of the fastening clip in a closed position, FIG. 2(*b*) is an end view of the fastening clip in an open position, and FIG. 2(*c*) is a side view of the fastening clip in an open position.
Figure 2B:
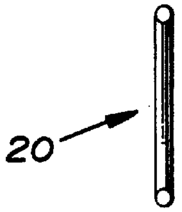
Figure 2C:
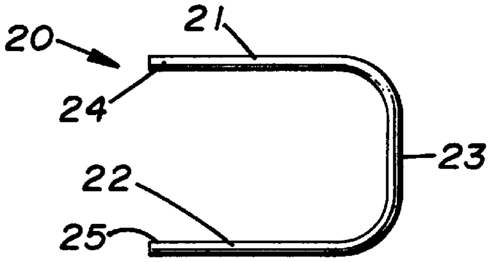

A deformable fastening clip 20 according to a second embodiment of the present invention is shown in FIGS. 2(*a*) to 2(*c*). This deformable fastening clip 20 has first and second legs 21, 22 and a body portion 23 connecting the legs 21, 22. The legs 21,22 of the fastening clip 20 are generally straight in this embodiment and lie in a common plane with the body portion 23. That is, neither of the legs 21, 22 is bent away from a plane containing the other leg. This reduces the cost of the fastening clip 20 slightly because a simpler manufacturing process can be used if neither of the legs 21, 22 is to be bent. In its deformed or closed position, as shown in FIG. 2(*a*), the fastening clip 20 preferably has its ends 24, 25 overlapped to better secure the fastening clip 20 around the reinforcement steel members.

The deformable fastening clip 20 shown in FIGS. 2(*a*) to 2(*c*) is preferably constructed of similar materials and sizes as the deformable fastening clip 10 shown in FIGS. 1(*a*) to 1(*c*), as described above.

Figure 3:
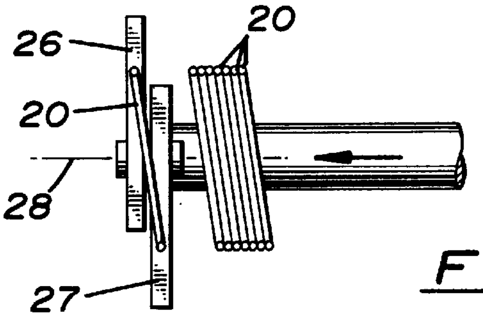
FIG. 3 is a bottom view of a portion of an applicator tool for applying the fastening clips according to the second embodiment of the present invention.

Since the deformable fastening clip 20 shown in FIGS. 2(*a*) to 2(*c*) is completely flat and does not have a bent portion to facilitate overlapping the legs 21, 22 when the fastening clip 20 is closed, a special tool is preferably used to deform the fastening clips 20. A portion of such a tool is shown in FIG. 3. The tool has a pair of jaws 26, 27 that pivot about a common axis 28 and are slightly offset from each other. The fastening clips 20 are fed to the jaws 26, 27 one-at-a-time in a slightly canted manner so that the legs 21, 22 of each fastening clip 20 are engaged by a respective one of the offset jaws 26, 27. Upon pivoting the offset jaws 26, 27 together, the fastening clip 20 held between the jaws 26, 27 is deformed into its closed position with its legs 21, 22 overlapped. The offset jaws 26, 27 of the tool prevent the legs 21, 22 from abutting and interfering with each other when the fastening clip 20 is deformed into its closed position.

Figure 4:
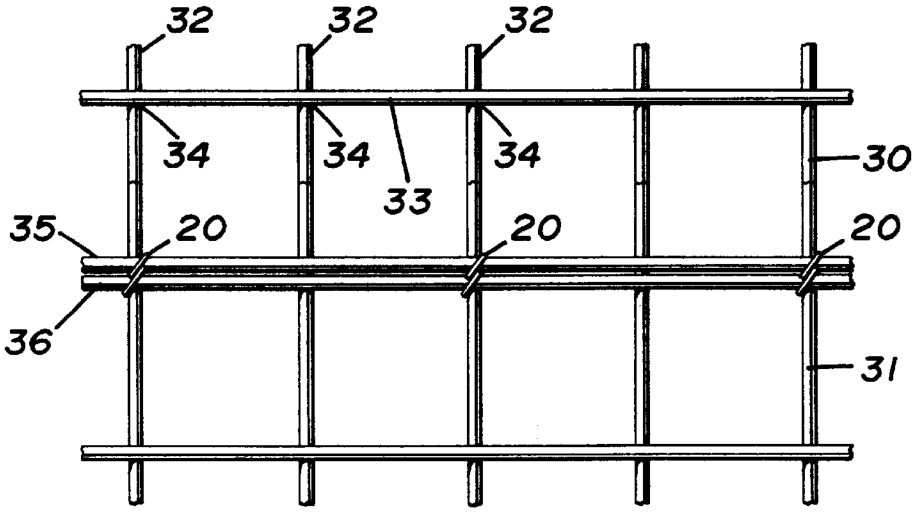
FIG. 4 is a plan view of wire mesh reinforcement steel panels secured together with deformable fastening clips according to the present invention.

FIG. 4 shows a pair of heavy gage steel mesh sheets 30, 31 for use as concrete reinforcement steel, which are secured together using the deformable fastening clips 20 according to the present invention. The steel mesh sheets 30, 31 have a grid pattern of steel members 32, 33 welded together at their intersection points 34 in a known manner. The edges 35, 36 of the steel mesh sheets 30, 31 are abutted and secured together at spaced locations using the deformable fastening clips 20. After being secured together in a desired pattern, the steel mesh sheets 30, 31 can be used to provide reinforcement steel in a precast or cast-in-place concrete structure.

Figure 5:
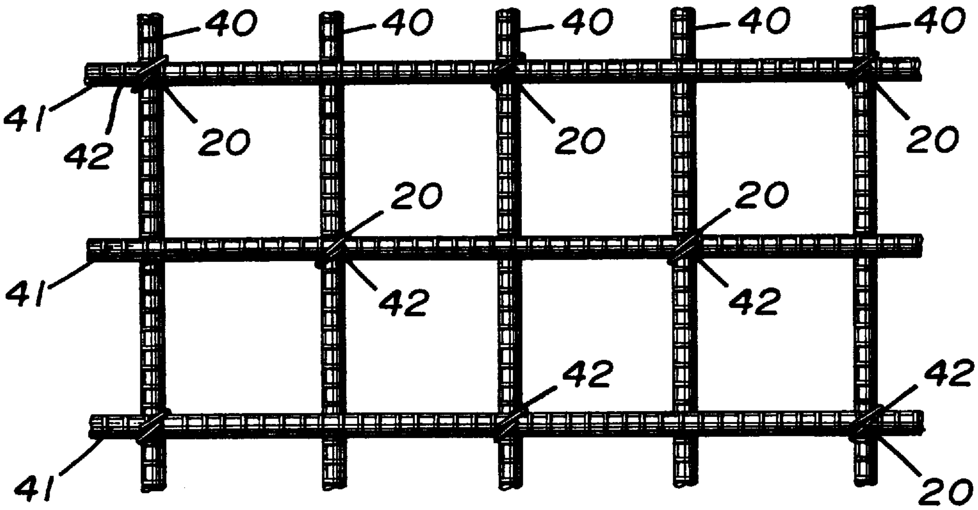
FIG. 5 is a plan view of a grid of reinforcement steel rebar secured together with deformable fastening clips according to the present invention.

FIG. 5 shows a grid pattern of steel rebar members 40, 41 for use as concrete reinforcement steel. The rebar members 40, 41 are secured together at points 42 where the rebar members 40, 41 intersect using the deformable fastening clips 20 according to the present invention. To reduce labor and material costs, the grid of rebar members 40, 41 can be secured together at every-other intersection point 42, as shown in FIG. 5. After being secured together in a desired pattern, the grid pattern of steel rebar members 40, 41 can be used to provide reinforcement steel in a precast or cast-in-place concrete structure.

Figure 6:
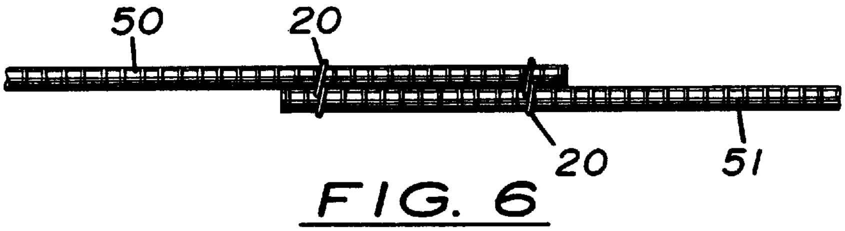
FIG. 6 is a side view showing two reinforcement steel rebar members secured together using the deformable fastening clips according to the present invention.
Figure 7:
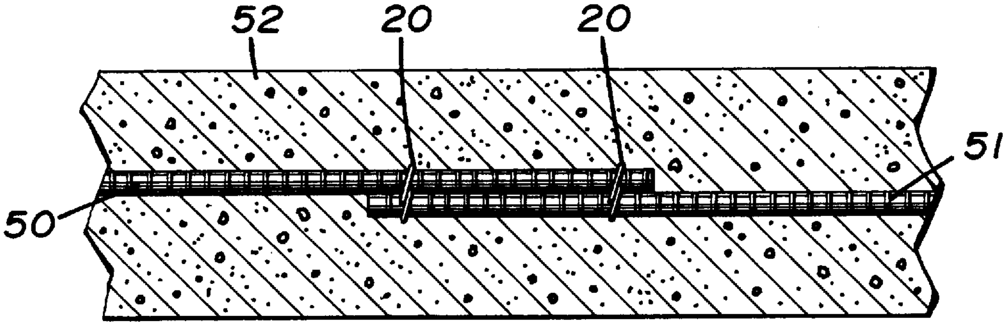
FIG. 7 is a side view similar to FIG. 6 showing two reinforcement steel rebar members secured together within a concrete formation using the deformable fastening clips according to the present invention.

FIG. 6 shows a pair of steel rebar members 50, 51 secured together end-to-end using two deformable fastening clips 20 according to the present invention. FIG. 7 shows the steel rebar members 50, 51 of FIG. 6 embedded in a concrete structure 52, such as a wall or floor.

The deformable fastening clip arrangement according to the present invention provides a positive and secure clamping of rebar or heavy gage wire mesh for use in reinforcing a concrete structure. The positive clamping causes the deformed steel of the fastening clip to interlock with the steel of the rebar or wire mesh and prevent slippage. The deformable fastening clip of the present invention thus results in a stronger assembly of reinforcement steel than the prior art.

The deformable fastening clip arrangement according to the present invention is fast and simple to install with specially designed pliers, a pneumatic gun, or other suitable mechanism. By installing the fastening clips of the present invention with a pneumatic gun, a labor reduction of approximately 90 percent can be realized over the conventional hand typing methods described above.

The fastening clips of the present invention can be formed by shearing the clips from 12 gage stainless steel wire or a suitable high carbon content steel wire. A simple progressive die can be used to form the shape of the fastening clips 10, 20. Tape can then be stuck to the back of the multiple fastening clips 10, 20 to facilitate loading of the fastening clips into the applicator.

The conventional process of cutting tie wire with pliers to fasten together reinforcement steel members often leaves a razor sharp edge which can become dangerous at a construction site. The fastening clips according to the present invention can be provided with smooth ends, which do not present a hazard at the construction site.

As will be readily apparent from the above description, the use of deformable steel fastening clips according to the present invention will greatly lower labor cost, expedite construction projects, and vastly improve the structural integrity of concrete structures in all instances where reinforcement steel is used.

It will be appreciated that the present invention is not limited to the exact construction and method that have been described above and illustrated in the accompanying drawings, and that various modifications and changes can be made without departing from the scope and spirit thereof. It is intended that the scope of the invention only be limited by the appended claims.

What is claimed is:

1. A method of fastening concrete reinforcement steel, comprising the steps of:

providing a generally U-shaped, deformable fastening clip consisting of first and second generally straight legs and a body portion connecting said first and second legs, said fastening clip having an open side;

positioning at least two reinforcement steel rebar members for a concrete structure adjacent to each other;

placing said open side of said deformable fastening clip over said rebar members; and deforming said first and second legs of said fastening clip about said rebar members to thereby secure said rebar members together.

2. The method of fastening concrete reinforcement steel according to claim 1, wherein said first and second legs of said deformable fastening clip have first and second ends, respectively, and said deforming step comprises deforming said fastening clip until said first and second ends of said fastening clip overlap each other.

3. The method of fastening concrete reinforcement steel according to claim 1, further comprising the step of forming concrete around said rebar members secured by said fastening clip.

4. The method of fastening concrete reinforcement steel according to claim 1, further comprising the steps of positioning said rebar members in a grid pattern and securing said rebar members together at selected locations using a plurality of said deformable fastening clips.

5. The method of fastening concrete reinforcement steel according to claim 1, wherein said rebar members comprise wire mesh sheets of rebar members.

6. The method of fastening concrete reinforcement steel according to claim 1, wherein said step of providing a deformable fastening clip comprises providing said deformable fastening clip with at least one of said first and second legs being bent away from a plane containing said body portion of the deformable fastening clip to prevent said first and second legs from abutting and interfering with each other when the fastening clip is closed over said rebar members.

7. The method of fastening concrete rebar according to claim 1, wherein said step of providing a deformable fastening clip comprises providing said deformable fastening clip with said first and second legs being coplanar with said body portion, and further comprising the step of deforming said fastening clip using offset jaws to prevent said first and second legs from abutting and interfering with each other as the fastening clip is closed over said reinforcement steel members.

8. The method of fastening concrete reinforcement steel according to claim 1, wherein said deformable fastening clip is made from 12 to 14 gage steel wire having a length greater than approximately four inches.

* * * * *